(12) United States Patent
Baldwin et al.

(10) Patent No.: US 7,541,541 B1
(45) Date of Patent: Jun. 2, 2009

(54) SAFETY OUTLET COVER

(75) Inventors: Jeffrey P Baldwin, Phoenix, AZ (US); Lincoln Jolley, Kearns, UT (US)

(73) Assignee: TayMac Corporation, Gilbert, AZ (US)

( * ) Notice: Subject to any disclaimer, the term of this patent is extended or adjusted under 35 U.S.C. 154(b) by 131 days.

(21) Appl. No.: 11/556,320

(22) Filed: Nov. 3, 2006

Related U.S. Application Data

(60) Provisional application No. 60/733,426, filed on Nov. 3, 2005.

(51) Int. Cl.
*H02G 3/14* (2006.01)
*H05K 5/03* (2006.01)

(52) U.S. Cl. .................... 174/67; 174/66; 220/241; 220/242; 439/135; 439/145

(58) Field of Classification Search .................. 174/66, 174/67, 135; 220/241, 242, 3.8; 439/135, 439/195, 137, 145, 136, 148, 346, 732, 140
See application file for complete search history.

(56) References Cited

U.S. PATENT DOCUMENTS

| | | | | | |
|---|---|---|---|---|---|
| 2,477,803 | A | * | 8/1949 | Huber | 439/145 |
| 2,818,991 | A | * | 1/1958 | Hes | 439/135 |
| 2,820,842 | A | * | 1/1958 | Meistrell | 220/242 |
| 3,068,442 | A | | 12/1962 | Kubik | |
| 3,810,070 | A | | 5/1974 | Ludwig | |
| 3,840,692 | A | | 10/1974 | Wells | |
| 3,865,456 | A | * | 2/1975 | Dola | 439/145 |
| 4,094,569 | A | | 6/1978 | Dietz | |
| 4,257,659 | A | | 3/1981 | Gibbs | |
| 4,600,258 | A | | 7/1986 | Hu | |
| 4,733,017 | A | | 3/1988 | Wolfe-Taylor et al. | |
| 4,793,818 | A | | 12/1988 | Poirier | |
| 4,798,916 | A | | 1/1989 | Engel et al. | |
| 4,857,004 | A | | 8/1989 | Poirier | |
| 4,952,755 | A | | 8/1990 | Engel et al. | |
| 4,970,349 | A | | 11/1990 | Jones | |
| 5,240,426 | A | * | 8/1993 | Barla | 174/67 |
| 5,288,945 | A | | 2/1994 | Bruce | |
| 5,813,873 | A | | 9/1998 | McBain | |
| 5,998,735 | A | * | 12/1999 | Patterson, Jr. | 220/242 |
| 6,217,353 | B1 | * | 4/2001 | Yu-Tse | 174/67 |
| 6,222,125 | B1 | | 4/2001 | Shoemaker | |
| 6,372,987 | B1 | * | 4/2002 | Ha | 174/66 |
| 6,384,354 | B1 | | 5/2002 | Shotey et al. | |

(Continued)

OTHER PUBLICATIONS

Safety 1st web page entitled, "Home Safety—10403-Two Touch Outlet Covers", 1 page, 2006.

(Continued)

*Primary Examiner*—Angel R Estrada
(74) *Attorney, Agent, or Firm*—Booth Udall, PLC

(57) ABSTRACT

A safety outlet cover that includes a cover with a front face including plug blade apertures. The safety cover may include a cover with a front face where the front face is configured to cover the face of an electrical device except for a plurality of plug blade apertures therethrough. The cover also may include a mounting plate and a spring element formed as a single piece where the mounting plate includes a receptacle face aperture. When the cover and mounting plate are coupled at a rest position, the cover is configured to cover a plug blade socket in a receptacle face.

26 Claims, 5 Drawing Sheets

U.S. PATENT DOCUMENTS

| | | |
|---|---|---|
| 6,545,218 B1 * | 4/2003 | Blaess ........................ 220/241 |
| 6,699,050 B1 | 3/2004 | Wong |
| 7,094,969 B1 | 8/2006 | In |
| 7,098,403 B2 * | 8/2006 | Jolley ......................... 174/66 |
| 2003/0019652 A1 | 1/2003 | Shoemaker |
| 2004/0256134 A1 | 12/2004 | Jolley |

OTHER PUBLICATIONS

Safety 1st web page entitled, "Home Safety—10406-Swivel Outlet Cover", 1 page, 2006.

* cited by examiner

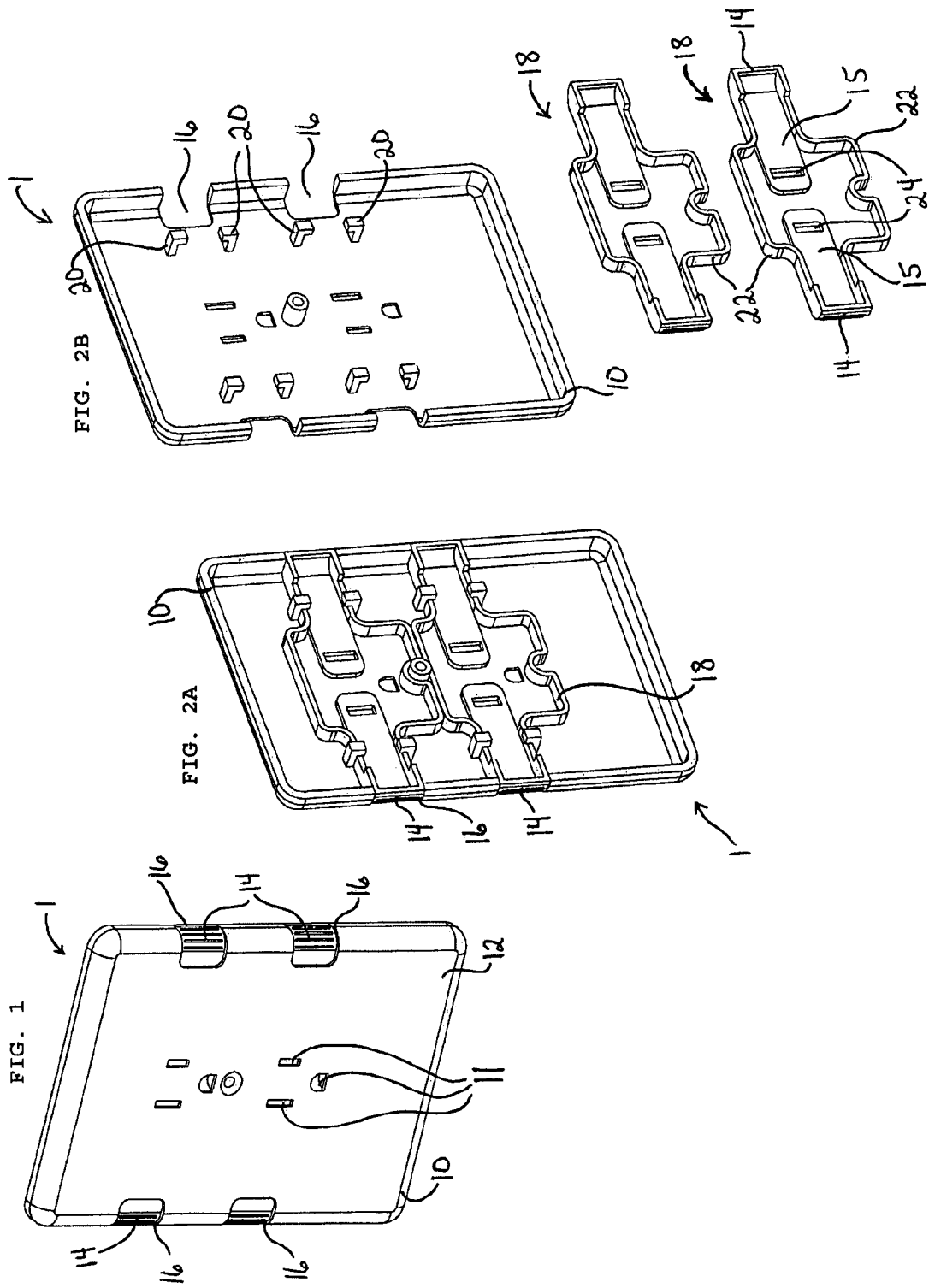

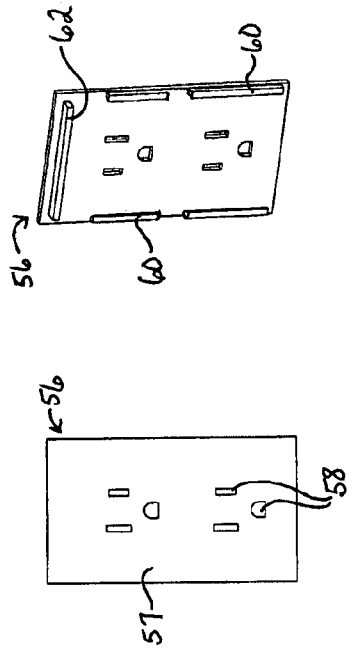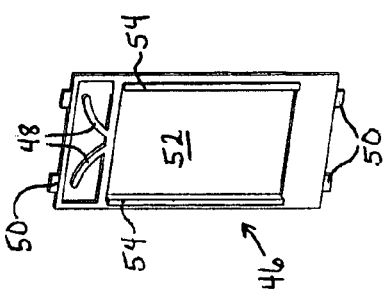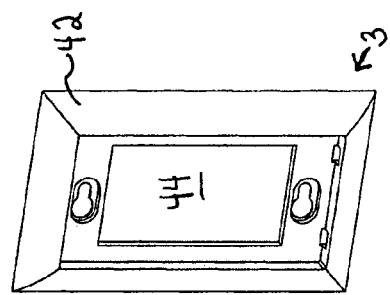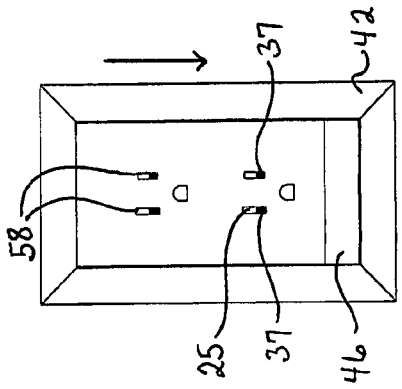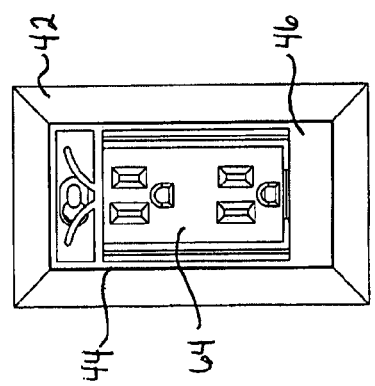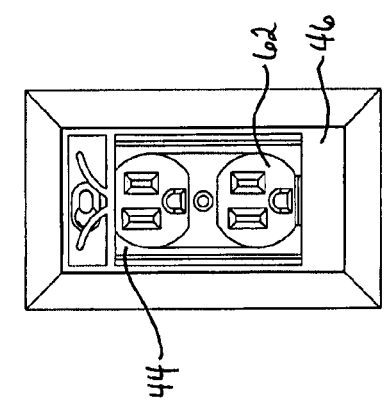

SAFETY OUTLET COVER

CROSS REFERENCE TO RELATED APPLICATIONS

This application claims the benefit of the filing date of U.S. Provisional Patent Application 60/733,426, entitled "Safety Outlet Cover" to Shotey, et al. which was filed on Nov. 3, 2005, the contents of which are hereby incorporated herein by reference.

BACKGROUND

1. Technical Field

Aspects of this document relate generally to covers for electrical devices.

2. Background Art

Covers are used to prevent access to the energized exposed metal wires supplying power to electrical devices mounted in the conventional electrical boxes used in residential and commercial buildings. Conventional covers contain openings that allow the faces of devices like receptacles to be exposed so that electrical plugs or connectors can be inserted into or coupled with the devices. For receptacles, the openings in the face are large enough to permit insertion of small electrically conductive objects by children, exposing them to the risk of electric shock. Various safety covers have been devised to reduce or eliminate the risk of electric shock from electrical devices. These covers are typically semi-permanent, mounted to the electrical device, and work by preventing access to the electrical device to those who lack adult strength or dexterity.

SUMMARY

One aspect of particular implementations of a safety cover includes a cover with a front face that has only plug blade apertures. A particular implementation of a safety cover includes a cover with a front face, the front face configured to cover the face of an electrical device except for a plurality of plug blade apertures therethrough. The cover also may include a mounting plate and a spring element formed as a single piece where the mounting plate includes a receptacle face aperture. When the cover and mounting plate are coupled and the cover is at a rest position, the cover is configured to cover a plug blade socket in a receptacle face.

Particular implementations of a safety cover may include a cover rail member and a mounting plate that has a plate rail member where the cover and the mounting plate are slidably coupled through the cover rail member and plate rail member. In addition, implementations may have a rear surface of the cover in contact with the receptacle face when the cover and the mounting plate are coupled. In some implementations, the thickness of the cover in a region surrounding the plug blade apertures may be between about 0.020 inches and about 0.075 inches.

In some particular implementations, the spring member may include at least one curved projection coupled to the mounting plate at only one end of the at least one curved projection. In other particular implementations, the spring member may include at least one curved projection coupled to the mounting plate at both ends of the at least one curved projection.

Some particular implementations of a safety cover may include a mounting plate that contains a keyhole slot mounting aperture. In other implementations, the mounting plate may be coupled with an electrical box through prongs, clips, wire, Velcro®, glue, screws, tape or box mounting screw inserts.

In some particular implementations of a safety cover, the mounting plate further includes a frame and at least one mounting member, where the frame is configured to couple with the mounting plate through the mounting member at a mounting aperture in the frame. The cover may further include a bias projection extending from a rear surface configured to engage with the spring member of the mounting plate. The cover may further include a cover rail member and the mounting plate may further include a plate rail member where the cover and the mounting plate are slidably coupled through the cover rail member and plate rail member.

In another aspect, a particular implementation of a safety cover includes a cover with a button opening on a side of the cover. A safety insert and spring element formed as a single piece may be included, the spring element including a blocking element with a plug blade aperture. The safety insert may be coupled to a rear surface of the cover through a plurality of mounting projections. The blocking element is configured to permit an electrical plug to enter a plug blade socket in a face of a receptacle located behind the cover through the plug blade aperture in the blocking element when the safety insert is in a biased position.

In another aspect, particular implementations of a safety cover may include an installation method including the steps of placing a mounting plate and a spring element over an electrical device where the mounting plate and spring element are formed as a single piece. A cover is coupled to the mounting plate, the cover having a front face configured to cover the face of an electrical device except for a plurality of plug blade apertures therethrough. The cover is biased to a rest position with the spring element and covers a plug blade socket in the face of the electrical device. The method of installing particular implementations may include placing a back surface of the cover plate in contact with the face of the electrical device. The method of installing some particular implementations of an electrical device may also include slidably coupling the cover to the mounting plate.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Various implementations and aspects will hereinafter be described in conjunction with the appended drawings, where like designations denote like elements, and:

FIG. 1 is a front perspective view of a safety cover assembly;

FIG. 2a is a rear perspective view of a safety cover assembly;

FIG. 2b is a rear perspective exploded view of the cover and spring elements illustrated in FIG. 2a;

FIG. 9 is a front perspective view of a frame with a mounting aperture;

FIG. 10 is a front perspective view of a mounting plate with mounting projections;

FIG. 11a is a front perspective view of a cover with plug blade apertures;

FIG. 11b is a rear perspective view of the cover of FIG. 11a showing a bias projection;

FIG. 12 is a front view of a frame with a mounting plate installed over a duplex receptacle;

FIG. 13 is a front view of a frame with a mounting plate installed over a ground fault current interrupter receptacle;

FIG. 14 is a front view of an assembled safety cover assembly including a frame, a mounting plate, and a cover installed over a receptacle.

DESCRIPTION

Figure 3:
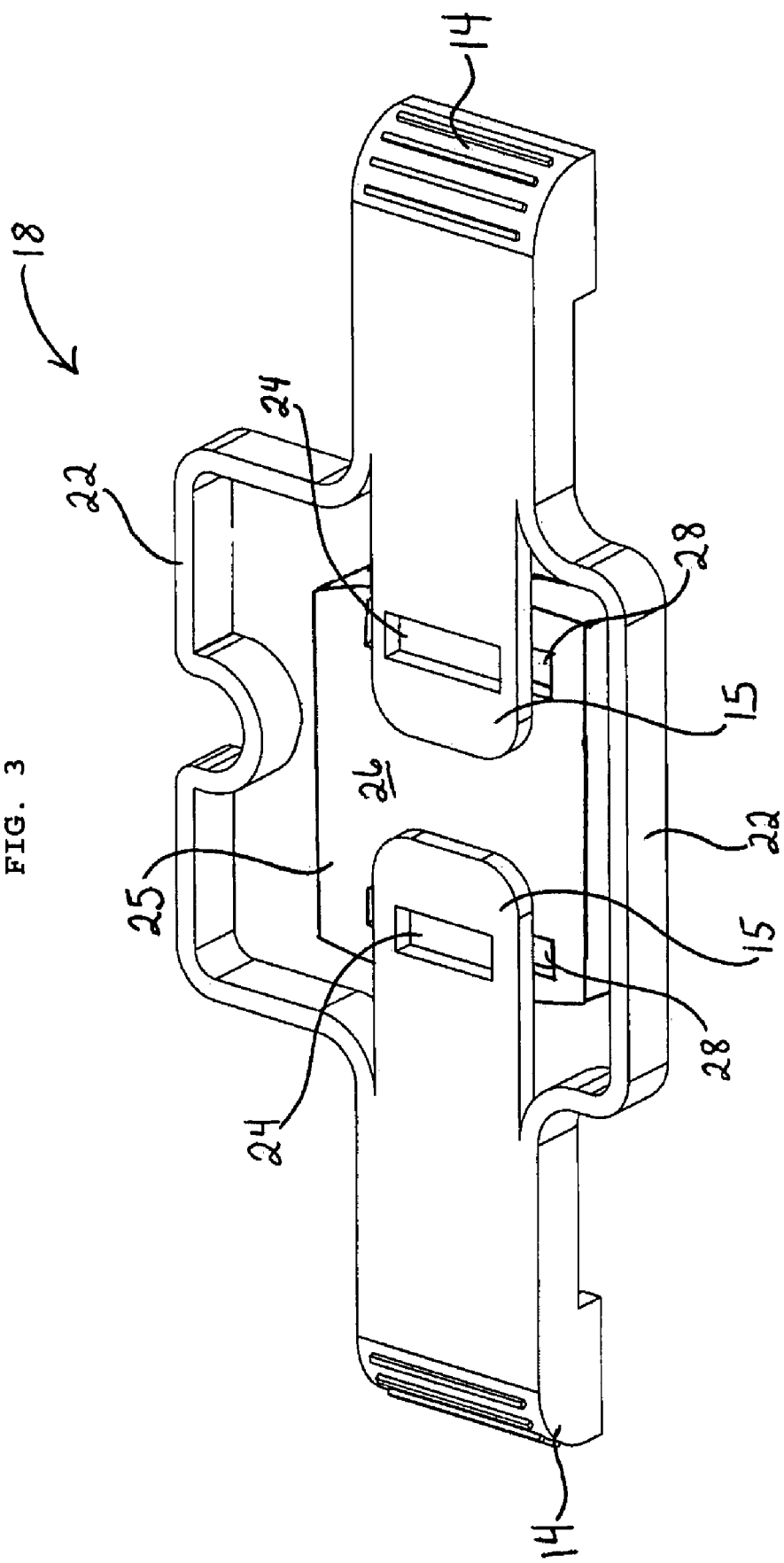
FIG. 3 is a detail perspective view of a spring element placed over a receptacle showing the alignment of the plug blade apertures with the plug blade sockets in the receptacle face when the buttons are under pressure in the biased position.

This disclosure, its aspects and implementations, are not limited to the specific components or assembly procedures disclosed herein. Many additional components and assembly procedures known in the art consistent with the intended safety outlet cover and/or assembly procedures for a safety outlet cover will become apparent for use with implementations of safety outlet covers from this disclosure. Accordingly, for example, although particular covers, mounting plates, spring elements, and receptacles are disclosed, such covers, mounting plates, spring elements, and receptacles and implementing components may comprise any shape, size, style, type, model, version, measurement, concentration, material, quantity, and/or the like as is known in the art for such covers, mounting plates, spring elements, and receptacles and implementing components, consistent with the intended operation of a safety outlet cover.

FIG. 1 illustrates a particular implementation of a safety outlet cover assembly 1 (hereafter "cover assembly"). The cover assembly 1 of this implementation includes a cover 10 with button openings 16 located in its sides and a plurality of plug blade apertures 111 in its front face 12. When no pressure is being exerted on the buttons 14, the cover assembly 1 is in a rest position, and the buttons may be configured to be substantially flush with the outer edge of the sides of the cover 10.

Referring to FIGS. 2a and 2b, a rear view of the particular implementation illustrated in FIG. 1 is shown. Safety inserts 18 may be coupled with the cover 10 through a plurality of mounting projections 20 or through some other method that allows the safety inserts 18 to slidably couple with the cover 10. The safety inserts 18 may include the buttons 14 which are coupled with spring elements 22 and blocking elements 15 which include plug blade apertures 24.

FIG. 3 illustrates a particular implementation of a safety insert 18. The safety insert 18 is shown mounted over a receptacle 25 with the cover 10 removed for illustrative purposes. The receptacle 25 may have a receptacle face 26 in which a plurality of plug blade sockets 28 are located. As illustrated, when inward pressure is exerted on both buttons 14 of the safety insert 18, the spring elements 22 flex allowing the blocking elements 15 to move inwardly. As the blocking elements 15 move inwardly, the plug blade apertures 24 align with the plug blade sockets 28 in the receptacle 25 and permit an electrical plug to be inserted into the receptacle 25. When the plug blade apertures 24 are aligned with the plug blade sockets 28, the safety assembly 1 is in a biased position. When the plug blade apertures 24 are in the unbiased, or rest position, the plug blade apertures 24 and the plug blade sockets 28 are not aligned, thus concealing and preventing access to the plug blade sockets 28. It should be noted that even in the "rest position", the plug blade apertures 24 may be under a bias, albeit a lesser bias than in the biased position. For example, the plug blade apertures 24 may be under constant bias and be moveable between the "biased position" where the plug blade apertures 24 align with the plug blade sockets 28 and the "rest position" where the plug blade apertures 24 are unaligned with the plug blade sockets 28.

Figure 4:
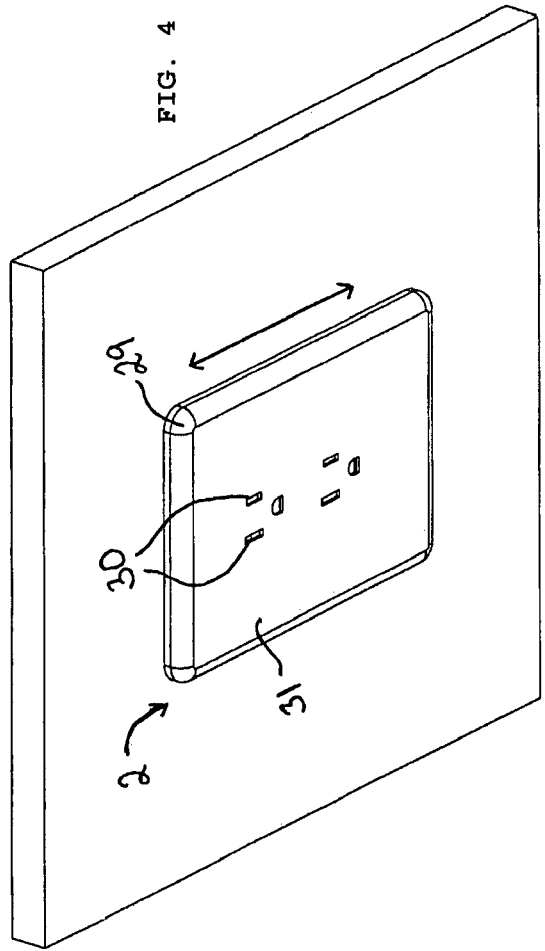
FIG. 4 is a front perspective view of a safety cover assembly.
Figure 5:
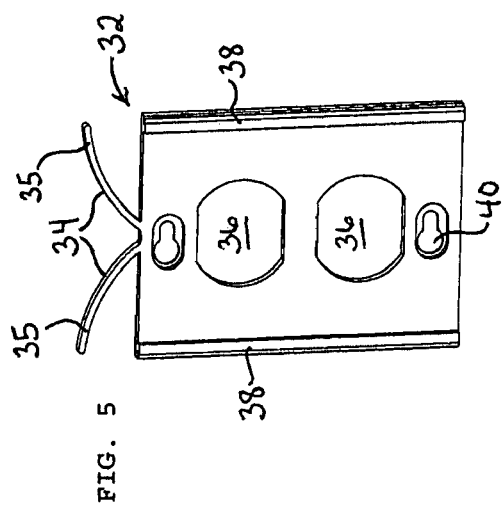
FIG. 5 is a front perspective view of a mounting plate with a spring element including two curved projections attached to the mounting plate at only one end.
Figure 8:
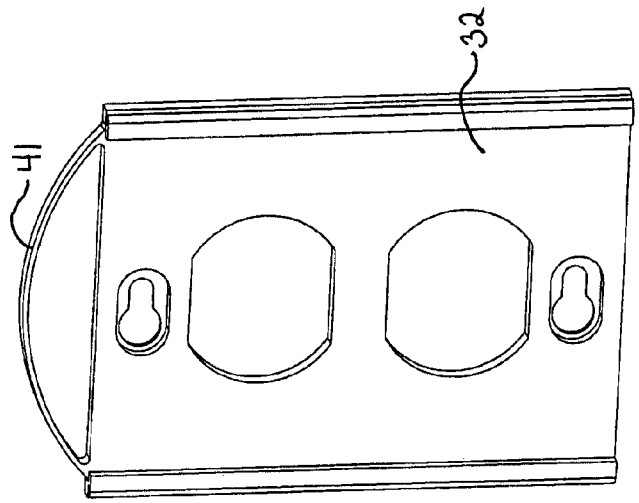
FIG. 8 is a front view of a mounting plate with a spring element having a curved projection attached to the mounting plate at both ends.

FIG. 4 illustrates another particular implementation of a cover assembly 2. The cover assembly 2 of this particular implementation includes a cover 29 with a front surface 31 through which a plurality of plug blades apertures 30 extend. As illustrated in FIG. 4, implementations of a cover assembly 2 may be configured to provide a screwless look, meaning that no cover screw apertures or cover screws are visible on the front surface 31 of the installed cover. Referring to FIG. 5, in this particular implementation the cover 29 is coupled with a mounting plate 32 that includes receptacle face apertures 36, keyhole slot mounting apertures 40, a spring element 34, and plate rail members 38. Mounting plates with other configurations are contemplated. The spring element 34 in the particular implementation illustrated in FIG. 5 includes two curved projections 33, 35 attached to the mounting plate at only one of their respective ends. The particular implementation shown in FIG. 8, a spring element 34 includes a curved projection 41 attached to the mounting plate at both of its ends. Particular implementations of a mounting plate 32 may include a plurality of curved or other shaped projections attached at only one end or at both ends or at some other point on the projection. For example, a straight cantilevered projection may alternatively be used if properly configured. Other implementations may include combinations of spring elements 34.

Figure 6:
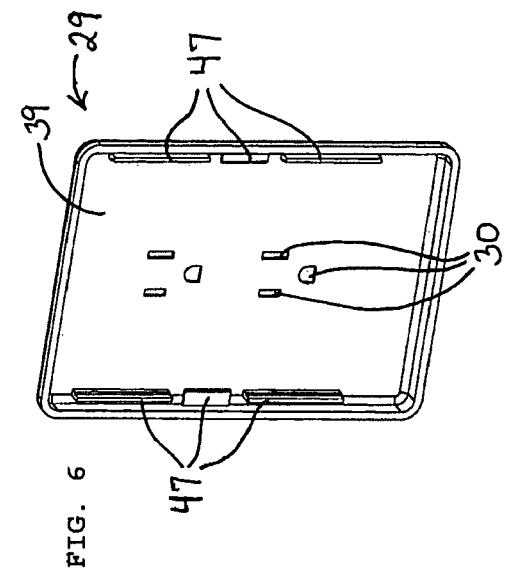
FIG. 6 is a rear perspective view of a cover with plug blade apertures and cover rail members.

FIG. 6 illustrates a particular implementation of cover 29. In this implementation, cover rail members 41 on the rear surface 39 of the cover 29 are configured to slidably couple with the rail members 38 of the mounting plate 32. Relevant teachings regarding the structure, materials, and use of rail members are found in U.S. Pat. No. 6,384,354 to Shotey et al. entitled "Cover for Electrical Switch" issued May 7, 2002, the contents of which are hereby incorporated herein by reference. The teachings of Shotey may be readily applied to the present implementations given the disclosure provided herein.

Figure 7B:
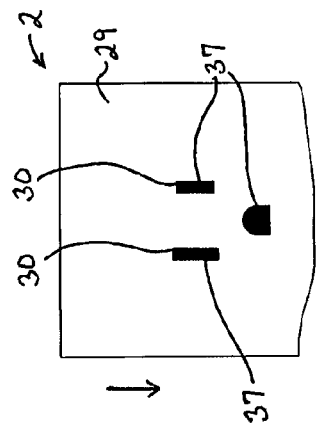
FIG. 7b is a front view of the cover of FIG. 7a in a biased position.
Figure 7A:
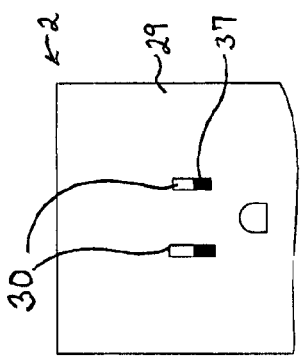
FIG. 7a is a front view of a cover in a rest position.

When a cover 29 is slidably coupled with a mounting plate 32, the spring element 34 may bias the cover toward the side of the mounting plate 32 on which the spring element 34 is located. Depending on the orientation of the mounting plate 32 and the configuration of the spring element 34, the cover 29 may move upward, downward, horizontally, or even diagonally under the influence of the spring element 34. The cover assembly 2 illustrated in FIG. 7a shows the cover 29 biased upward by the spring element 34. When the cover 29 stops moving under the influence of the bias of the spring element 34, it is in a rest position. FIG. 7a illustrates a cover assembly 2 in its rest position. For that implementation, the plug blade apertures 30 are not aligned with the plug blade sockets 37 in the receptacle, thus at least partially concealing and preventing access to the plug blade sockets 37. Referring to FIG. 7b, inserting a plug into the plug blade sockets 37 may require the cover 29 to be slid downward against the bias of the spring element 34 until the plug blade apertures 37 and plug blade sockets 37 align. When the plug blade apertures 37 and the plug blade sockets 37 align, the cover assembly 2 is in a biased position.

Particular implementations of a cover assembly 2 may include a mounting plate 32 that couples to an electrical box with various structures including, by non-limiting example, prongs, clips, wire, Velcro®, glue, screws, tape, or box mounting screw inserts. In addition, in some particular implementations, the thickness of the cover 29 around the plug blade apertures 30 may range from about 0.020 inches to about 0.075 inches. In particular implementations, the thickness of the cover 29 around the plug blade apertures 30 may range from about 0.020 inches to about 0.055 inches, more specifically from about 0.030 inches to about 0.055 inches, and most specifically from about 0.035 to about 0.045 inches. Also, referring to FIG. 6, other implementations may have the rear surface 39 of the cover 29 in contact with the receptacle face when the cover 29 is coupled with the mounting plate 32.

FIGS. 9 and 10 illustrate a particular implementation of a cover assembly 3 that includes a frame 42. The frame 42 may include a mounting aperture 44 for a mounting plate 46. The mounting plate 46 may include mounting projections 50 configured to couple the mounting plate 46 at the mounting aperture 44. Relevant teachings regarding the structure, manufacture, and use of particular implementations of the frame 42, the mounting projections 50, and the mounting aperture 44 are found in U.S. Utility patent application by Shotey, et al. entitled "Electrical Cover Plate" Ser. No. 11/466,756 which was filed on Aug. 23, 2006, the contents of which were previously incorporated herein by reference. The mounting plate 46 may also include a spring element 48, plate rail members 54, and a receptacle face aperture 52.

Referring to FIGS. 11a and 11b, a particular implementation of a cover 56 is illustrated. The cover 56 may include a front face 57 through which a plurality of plug blade apertures 58 extend. On the rear surface 59 of the cover 56, a plurality of cover rail members 60 may be attached along the edges of the cover 56. On a side of the rear surface 59 of the cover 56, a bias projection 62 may extend configured to engage with the spring element 48 of the mounting plate 46 when the cover 56 and the mounting plate 46 are slidably coupled with the cover rail members 60 and plate rail members 54.

Referring to FIG. 12, a frame 42 is shown installed over a duplex receptacle 62. In FIG. 13, a frame 42 is shown installed over a ground fault current interrupter receptacle 64. In both figures, a mounting plate 46 with identical dimensions is coupled with the frame 42 at the mounting aperture 44. As these figures illustrate, particular implementations of a mounting plate 42 may be capable of being installed over both duplex and ground fault current interrupter receptacles 62, 64 without a change of design dimensions or structure.

Referring to FIG. 14, a frame 42 is shown installed over a receptacle 25. A mounting plate 46 is coupled with the frame 42 and a cover 56 is slidably coupled with the mounting plate 46. When the cover 56 was coupled with the frame 42, the spring element 48 of the mounting plate 46 pushed the cover assembly 3 to a rest position where the plug blade apertures 58 in the cover 56 concealed the plug blade sockets 37 in the receptacle 25. Insertion of a plug into the plug blade sockets 37 may be accomplished by siding the cover 56 against the bias of the spring element 48 until the plug blade apertures 58 and the plug blade sockets 37 align with each other. In the implementation illustrated in FIG. 14, the cover 56 may be slid downward to align the plug blade apertures 58 with the plug blade sockets 37. When the plug blade apertures 58 and the plug blade sockets 37 are aligned, the cover assembly 3 is in a biased position. In other particular implementations, depending on how the mounting plate 46 and the frame 42 are installed over the receptacle 25, the cover 56 may be slid upward, downward, horizontally or some other direction to align the plug blade apertures 58 and plug blade sockets 37.

It will be understood that implementations are not limited to the specific components disclosed herein, as virtually any components consistent with the intended operation of a method and/or system implementation for a safety outlet cover may be utilized. Accordingly, for example, although particular covers, mounting plates, spring elements, and receptacles may be disclosed, such components may comprise any shape, size, style, type, model, version, class, grade, measurement, concentration, material, weight, quantity, and/or the like consistent with the intended operation of a method and/or system implementation for a safety outlet cover may be used.

In places where the description above refers to particular implementations of a safety outlet cover, it should be readily apparent that a number of modifications may be made without departing from the spirit thereof and that these implementations may be applied to other safety outlet covers. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than foregoing description. All changes that come within the meaning of and range of equivalency of the claims are intended to be embraced therein.

The invention claimed is:

1. A safety cover assembly comprising:
a cover comprising a front face, the front face configured to cover the face of an electrical device except for a plurality of plug blade apertures therethrough; and
a mounting plate and a spring element formed as a single piece, the mounting plate comprising a receptacle face aperture therethrough;
wherein when the cover and the mounting plate are coupled at a rest position, the cover is configured to cover a plug blade socket in a receptacle face; and
wherein a rear surface of the cover is in contact with the receptacle face when the cover and the mounting plate are coupled.

2. The safety cover assembly of claim 1, wherein the cover further comprises a cover rail member and the mounting plate further comprises a plate rail member, and wherein the cover and the mounting plate are slidably coupled through the cover rail member and plate rail member.

3. The safety cover assembly of claim 1, wherein the spring element comprises at least one curved projection coupled to the mounting plate at only one end of the at least one curved projection.

4. The safety cover assembly of claim 1, wherein the spring element comprises at least one curved projection coupled to the mounting plate at both ends of the at least one curved projection.

5. The safety cover assembly of claim 1, wherein the mounting plate further comprises a keyhole slot mounting aperture.

6. The safety cover assembly of claim 1, wherein the mounting plate is coupled to an electrical box with prongs, clips, wire, glue, screws, tape or box mounting screw inserts.

7. The safety cover assembly of claim 1, wherein the thickness of the cover is between about 0.020 inches and about 0.075 inches in a region surrounding the plug blade apertures.

8. A method of installing a safety cover assembly, the method comprising:
   placing a mounting plate and a spring element over an electrical device, the mounting plate and spring element formed as a single piece;
   coupling a cover to the mounting plate, the cover comprising a front face, the front face configured to cover the face of an electrical device except for a plurality of plug blade apertures therethrough;
   biasing the cover to a rest position with the spring element;
   covering a plug blade socket in the electrical device; and
   placing a back surface of the cover plate in contact with the electrical device face.

9. The method of installing a safety cover assembly of claim 8, wherein the method further comprises slidably coupling the cover to the mounting plate.

10. A safety cover assembly comprising:
    a cover comprising a front face, the front face configured to cover the face of an electrical device except for a plurality of plug blade apertures therethrough; and
    a mounting plate and a spring element formed as a single piece, the mounting plate comprising a receptacle face aperture therethrough;
    wherein when the cover and the mounting plate are coupled at a rest position, the cover is configured to cover a plug blade socket in a receptacle face; and
    wherein the spring element comprises at least one curved projection coupled to the mounting plate at both ends of the at least one curved projection.

11. The safety cover assembly of claim 10, wherein the cover further comprises a cover rail member and the mounting plate further comprises a plate rail member, and wherein the cover and the mounting plate are slidably coupled through the cover rail member and plate rail member.

12. The safety cover assembly of claim 10, wherein the mounting plate further comprises a keyhole slot mounting aperture.

13. A safety cover assembly comprising:
    a cover comprising a front face, the front face configured to cover the face of an electrical device except for a plurality of plug blade apertures therethrough; and
    a mounting plate and a spring element formed as a single piece, the mounting plate comprising a receptacle face aperture therethrough;
    wherein when the cover and the mounting plate are coupled at a rest position, the cover is configured to cover a plug blade socket in a receptacle face; and
    wherein the mounting plate further comprises a keyhole slot mounting aperture.

14. The safety cover assembly of claim 13, wherein the cover further comprises a cover rail member and the mounting plate further comprises a plate rail member, and wherein the cover and the mounting plate are slidably coupled through the cover rail member and plate rail member.

15. The safety cover assembly of claim 13, wherein the spring element comprises at least one curved projection coupled to the mounting plate at only one end of the at least one curved projection.

16. The safety cover assembly of claim 13, wherein the mounting plate is coupled to an electrical box with prongs, clips, wire, glue, screws, tape or box mounting screw inserts.

17. A safety cover assembly comprising:
    a cover comprising a front face, the front face configured to cover the face of an electrical device except for a plurality of plug blade apertures therethrough; and
    a mounting plate and a spring element formed as a single piece, the mounting plate comprising a receptacle face aperture therethrough;
    wherein when the cover and the mounting plate are coupled at a rest position, the cover is configured to cover a plug blade socket in a receptacle face; and
    wherein the mounting plate further comprises a frame and at least one mounting member, wherein the frame is configured to couple with the mounting plate through the mounting member at a mounting aperture in the frame.

18. The safety cover assembly of claim 17, wherein the cover further comprises a cover rail member and the mounting plate further comprises a plate rail member, and wherein the cover and the mounting plate are slidably coupled through the cover rail member and plate rail member.

19. The safety cover assembly of claim 17, wherein a rear surface of the cover is in contact with a receptacle face when the cover and the mounting plate are coupled.

20. The safety cover assembly of claim 17, wherein the spring element comprises at least one curved projection coupled to the mounting plate at only one end of the at least one curved projection.

21. The safety cover assembly of claim 17, wherein the spring element comprises at least one curved projection coupled to the mounting plate at both ends of the at least one curved projection.

22. The safety cover assembly of claim 17, wherein the cover further comprises a bias projection extending from a rear surface configured to engage with the spring element of the mounting plate.

23. The safety cover assembly of claim 22, wherein the cover further comprises a cover rail member and the mounting plate further comprises a plate rail member, and wherein the cover and the mounting plate are slidably coupled through the cover rail member and plate rail member.

24. A safety cover assembly comprising:
    a cover comprising a front face, the front face configured to cover the face of an electrical device except for a plurality of plug blade apertures therethrough; and
    a mounting plate and a spring element formed as a single piece, the mounting plate comprising a receptacle face aperture therethrough;
    wherein when the cover and the mounting plate are coupled at a rest position, the cover is configured to cover a plug blade socket in a receptacle face; and
    wherein the mounting plate is coupled to an electrical box with prongs, clips, wire, glue, screws, tape or box mounting screw inserts.

25. The safety cover assembly of claim 24, wherein the cover further comprises a cover rail member and the mounting plate further comprises a plate rail member, and wherein the cover and the mounting plate are slidably coupled through the cover rail member and plate rail member.

26. The safety cover assembly of claim 24, wherein the spring element comprises at least one curved projection coupled to the mounting plate at only one end of the at least one curved projection.

* * * * *